US012770439B2

(12) United States Patent
Hehn

(10) Patent No.: US 12,770,439 B2
(45) Date of Patent: Oct. 20, 2026

(54) METHOD FOR TRANSMITTING AN URGENT MESSAGE FROM A TRANSMITTING VEHICLE TO AT LEAST ONE RECEIVING VEHICLE VIA A RADIO NETWORK, AND MOTOR VEHICLE, TRANSMITTING CIRCUIT AND RECEIVING CIRCUIT

(71) Applicant: AUDI AG, Ingolstadt (DE)

(72) Inventor: Thorsten Hehn, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 370 days.

(21) Appl. No.: 18/041,368

(22) PCT Filed: Jul. 19, 2021

(86) PCT No.: PCT/EP2021/070087
§ 371 (c)(1),
(2) Date: Mar. 20, 2023

(87) PCT Pub. No.: WO2022/033808
PCT Pub. Date: Feb. 17, 2022

(65) Prior Publication Data

US 2023/0298396 A1 Sep. 21, 2023

(30) Foreign Application Priority Data

Aug. 10, 2020 (DE) ..................... 10 2020 120 970.3

(51) Int. Cl.
*G07C 5/00* (2006.01)
*H04W 74/00* (2009.01)

(52) U.S. Cl.
CPC .......... *G07C 5/008* (2013.01); *H04W 74/002* (2013.01)

(58) Field of Classification Search
CPC ...... G07C 5/008; H04W 74/002; H04W 4/46; H04W 72/02
See application file for complete search history.

(56) References Cited

U.S. PATENT DOCUMENTS 9,985,900 B2 5/2018 Stahlin et al.
2011/0034201 A1 2/2011 Hamada et al.
(Continued)

FOREIGN PATENT DOCUMENTS

CN 101350134 A 1/2009
CN 102892088 A 1/2013
(Continued)

OTHER PUBLICATIONS

CN106685472A_EnglishTranslation_Description (Year: 2017).*
(Continued)

*Primary Examiner* — Kito R Robinson
*Assistant Examiner* — Alexander V Gentile
(74) *Attorney, Agent, or Firm* — Sterne, Kessler, Goldstein & Fox P.L.L.C.

(57) ABSTRACT

The present disclosure relates to a method for transmitting an urgent message from a transmitting vehicle to at least one receiving vehicle via a radio network, while a normal message has already been outputted in a radio channel of the radio network by a subscriber of the radio network different from the transmitting vehicle. A transmitting circuit of the transmitting vehicle transmits the urgent message in the radio channel with a transmission level which is lower than a transmission level of the normal message. An associated receiving circuit of the at least one receiving vehicle receives a superimposition signal containing the normal message and the urgent message from the radio channel, extracts the normal message from the superimposition signal, determines a residual signal describing a difference
(Continued)

between the superimposition signal and the extracted normal message, and reconstructs the urgent message on the basis of the residual signal.

9 Claims, 2 Drawing Sheets

(56) References Cited

U.S. PATENT DOCUMENTS

| | | | | |
|---|---|---|---|---|
| 2017/0201985 | A1* | 7/2017 | Wang | H04B 7/15528 |
| 2018/0110002 | A1* | 4/2018 | Kim | H04L 1/0053 |
| 2019/0132165 | A1* | 5/2019 | Shieh | H04L 27/2691 |
| 2019/0138018 | A1* | 5/2019 | Cave | B60W 50/023 |
| 2019/0140672 | A1* | 5/2019 | Ping | H04B 1/0483 |
| 2019/0342061 | A1* | 11/2019 | Kim | H04L 5/10 |
| 2020/0064140 | A1 | 2/2020 | Tarkiainen et al. | |
| 2021/0345360 | A1* | 11/2021 | Yeo | H04W 72/1215 |
| 2022/0295492 | A1* | 9/2022 | Shattil | H04L 27/2636 |

FOREIGN PATENT DOCUMENTS

| | | | | | |
|---|---|---|---|---|---|
| CN | 104380780 | A | | 2/2015 | |
| CN | 106685472 | A | * | 5/2017 | H04L 5/003 |
| CN | 109981197 | A | | 7/2019 | |
| DE | 102013226605 | A1 | | 6/2015 | |
| DE | 102015104553 | A1 | | 10/2015 | |
| EP | 3585078 | A1 | | 12/2019 | |
| EP | 3614355 | A1 | * | 2/2020 | G08G 1/22 |
| WO | WO 2018/044365 | A2 | | 3/2018 | |

OTHER PUBLICATIONS

International Search Report of the International Searching Authority directed to related International Patent Application No. PCT/EP2021/070087, mailed Oct. 28, 2021, with attached English-language translation; 7 pages.

Islam S M Riazul et al, "Power-Domain Non-Orthogonal Multiple Access (NOMA) in SG Systems: Potentials and Challenges", IEEE Communications Surveys & Tutorials, (Apr. 1, 2017), vol. 19, No. 2, 2016; 22 pages.

Kim Taehyung et al, "Cooperative Superposed Transmission in Cellular-Based V2V Systems", IEEE Transactions on Vehicular Technology, IEEE Service Center, Piscataway, NJ, US, vol. 68, No. 12, Dec. 2019; 14 pages.

Watanabe, Y.; Sato, K.; Fujii, T.: Poster: a scheduling method for V2V networks using successive interference cancellation. In: 2016 IEEE Vehicular Networking Conference (VNC). IEEE, 2016; 2 pages.

International Preliminary Report on Patentability directed to related International Patent Application No. PCT/EP2021/070087, issued Feb. 7, 2023, with attached English-language translation; 16 pages.

* cited by examiner

METHOD FOR TRANSMITTING AN URGENT MESSAGE FROM A TRANSMITTING VEHICLE TO AT LEAST ONE RECEIVING VEHICLE VIA A RADIO NETWORK, AND MOTOR VEHICLE, TRANSMITTING CIRCUIT AND RECEIVING CIRCUIT

TECHNICAL FIELD

The present disclosure relates to a method for transmitting a message from a transmitting vehicle to at least one receiving vehicle via a radio network. This message is to be transmitted with the time delay as low as possible, wherefore it is referred to as urgent message afterwards. The present disclosure also provides a transmitting circuit for emitting such an urgent message and a receiving circuit for receiving the urgent message. Finally, the present disclosure includes a motor vehicle, in which the transmitting circuit and/or the receiving circuit are provided.

BACKGROUND

Motor vehicles can coordinate their driving maneuvers in an autonomous driving operation or with the aid of a driver assistance function in that they exchange messages via a radio network. Thus, the motor vehicles can for example perform a convoy operation or a convoy drive, in which synchronized common driving maneuvers occur, e.g. simultaneous accelerations or decelerations. Presetting the driving maneuver and the synchronization thereof can be allowed by radio-based messages in the radio network.

The radio standard preset for such messages in the radio network can for example be the so-called V2V communication (V2V—vehicle to vehicle) or the V2X communication (V2X—vehicle to anything, vehicle to any other communication partner or subscriber of the radio network). Simple messages can be provided as the messages, which are not connection-oriented, but are emitted according to the principle “fire and forget”, after which an acknowledgement about a possible reception by a receiving vehicle is not awaited or expected. In contrast, complex interactions can be provided, which correspond to a connection-oriented communication and provide at least three messages, for example three V2X messages, per communication sequence or agreement procedure, wherein the content of the second and third and each further message is each dependent on the content of at least one preceding message, which can originate from different motor vehicles and/or other V2X subscribers (for example a transmitting beacon at the roadside). Such complex interactions are for example defined by the 5GAA (5G Automotive association). Here, a platform or a framework is developed, which provides a protocol for the complex interactions on the so-called application layer. Protocols for underlying communication layers (PHY, MAC, PDCP) are not addressed by the 5GAA, but new technical possibilities like the standard 5GNR-V2X (3GPPR16, RGPPR17) of such communication layers are taken into account. Thus, unicast and multicast transfers can be taken into account and also the reliable delivery of packets, for example by means of hybrid-automatic repeat request (HARQ) as a transfer scheme.

BRIEF DESCRIPTION OF DRAWINGS/FIGURES

DETAILED DESCRIPTION

Figure 1:
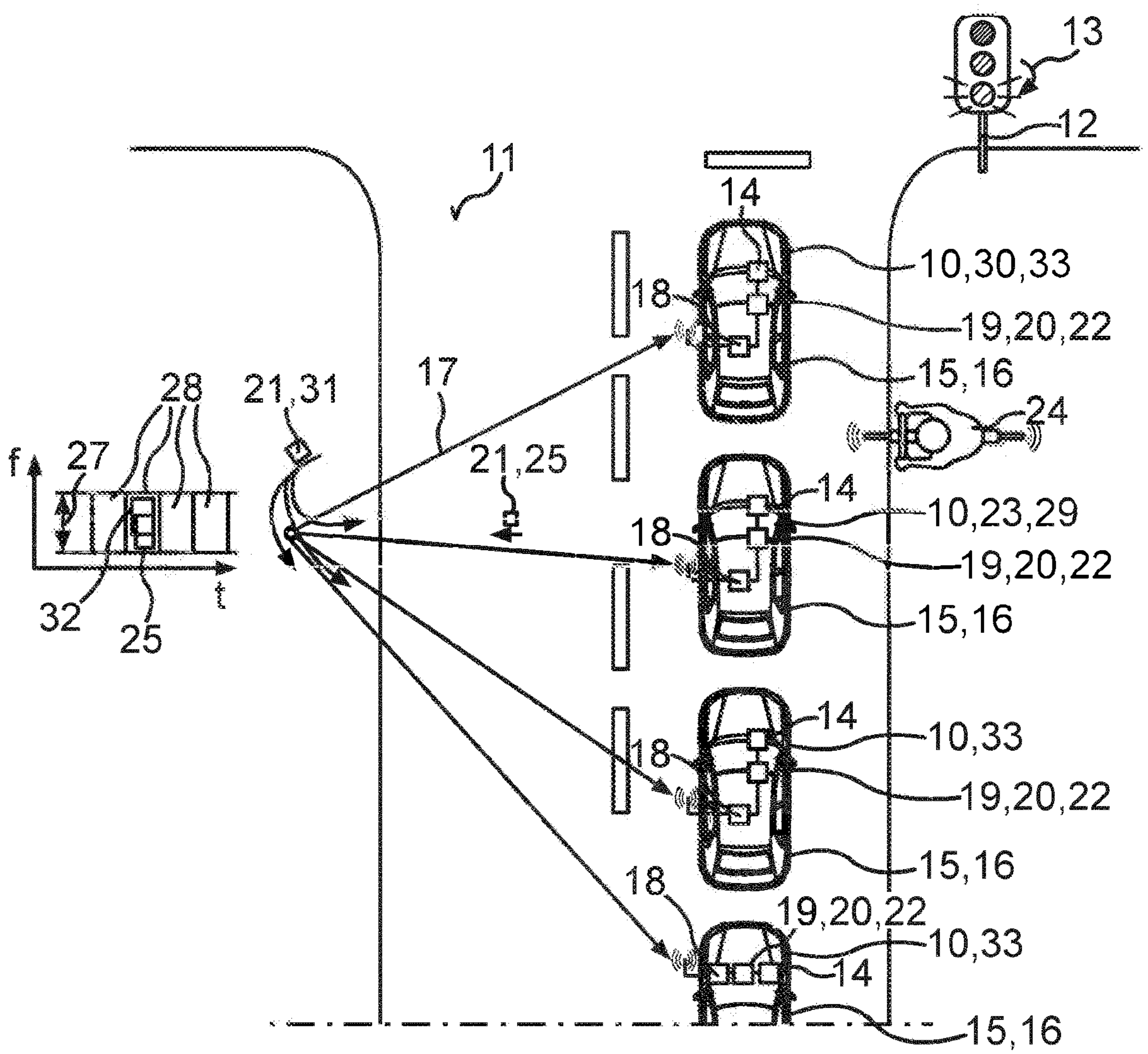
FIG. 1 illustrates a schematic representation of multiple motor vehicles.

A basic problem in the communication on the application layer is in that the complex interactions, which motor vehicles execute among each other by means of multiple messages, always assume that all of the motor vehicles of a vehicle convoy or all of the motor vehicles in the radio network generally receive messages relating to the next driving maneuver and correspondingly behave. Thus, this case of application presumes that the motor vehicles are synchronized in planning the driving maneuvers and then also commonly execute the driving maneuvers, on which they agree in a decision process, e.g. simultaneous braking.

However, there may be a driving situation, in which a motor vehicle has to suspend the convoy operation, thus can for example no longer subscribe to the radio network. This can occur if an unexpected event occurs, such as for example an obstacle appearing on the roadway or a medical emergency (for example if a vehicle occupant has physical afflictions). Then, the motor vehicle has to leave the group of the motor vehicles driving in the convoy operation, thus terminate the cooperative operation with the other motor vehicles. Namely, such a motor vehicle then either can join to another cooperatively driving vehicle group, which is currently more relevant to the motor vehicle, or autonomously plan individual actions only for the motor vehicle itself. However, a last task of the motor vehicle in the previous cooperative driving operation is in informing the current vehicle group, to which it belongs, about the termination of the cooperative driving operation in order that the remaining motor vehicles of the vehicle group can consider the then uncoordinated driving operation of this retiring motor vehicle.

However, since the abortion of the cooperative driving operation usually occurs in a critical situation, in which there is high communication demand, thus, the radio channel of the radio network can be occupied by another subscriber of the radio network because the remaining motor vehicles also have to communicate with each other, the urgent message, by means of which a motor vehicle wishes to signal the termination of its cooperative driving operation to the remaining motor vehicles, can be delayed.

Motor vehicles, which exchange messages among each other by means of a radio network, are for example described in DE 10 2015 104 553 A1. The transfer of the messages is effected based on a synchronized data transfer in preset time slots. If a subscriber of the radio network emits a message during a time slot, the remaining subscribers of the radio network have to suppress their transmitting operation. Thus, these remaining subscribers cannot emit an urgent message.

From DE 10 2013 226 605 A1, a description of the V2X communication is available. Here, transmitted messages are referred to as dispatches.

From EP 3 585 078 A1, it is described in context of the V2X communication that by means of it, a cooperative driving operation cannot only be allowed for autonomous vehicles, but also generally by means of driver assistance devices of motor vehicles.

A scientific publication of Watanabe et al. (WATANABE, Y.; SATO, K.; FUJII, T.: Poster: a scheduling method for V2V networks using successive interference cancellation. In: 2016 IEEE Vehicular Networking Conference (VNC). IEEE, 2016. p. 1-2.—ISSN 2157-9865) describes that by means of a variant of the SIC (successive interference cancellation), it can be determined in an ad-hoc radio network of motor vehicles, which motor vehicles simultaneously transmit in a synchronization phase according to the standard ALOHA. According to distance between the motor vehicles, the signals thereof have different signal strengths in the receiving vehicles, which is used to allow two motor vehicles to transmit in the same time slot since the signals thereof can be again separated by means of the SIC in all of the receiving vehicles.

In US 2011/0034 201 A1, it is described that a vehicle-to-vehicle communication can be effected packet-based and headers of data packets can be defined for it.

In US 2020/0064 140 A1, it is described that motor vehicles can drive in a convoy and therein form an ad-hoc radio network to coordinate driving maneuvers. Vehicles can join to the network or leave it.

The present disclosure is based on the object to transfer an urgent message from a transmitting vehicle to at least one receiving vehicle with low delay via a radio network, which the motor vehicles operate among each other.

The object is solved by the subject matters of the independent claims. Advantageous embodiments are described by the dependent claims, the following description as well as the figures.

An aspect of the invention relates to a method for transferring an urgent message from a transmitting vehicle to at least one receiving vehicle via a radio network, while a normal message is already emitted by a subscriber of the radio network different from the transmitting vehicle in a radio channel of the radio network, wherein in the method a transmitting circuit of the transmitting vehicle emits the urgent message in the radio channel with a transmission level, which is less than it is provided in the radio network for transmitting the normal message. Thus, it is assumed by the method that the radio channel can already be occupied at the point of time, at which an urgent message is to be emitted. This message or dispatch transferred herein is referred to as normal message. With normal message, it is meant that the other subscriber of the radio network regularly emits its normal message because the radio channel was free for it or it was the first one, which has occupied the radio channel for emitting the normal message. In particular, the normal message is emitted according to the radio standard, that is a signal level and/or a coding is adjusted or set by the other subscriber according to the radio standard. Now, if in the transmitting vehicle, the transmitting circuit thereof detects that the radio channel is already occupied, thus, the urgent message nevertheless is not retained, but the urgent message is superimposed or superposed on the normal message in that the urgent message is also emitted in the same radio channel, in which the normal message is transferred, as a superimposition signal with a transmission level less than it is provided for transmitting a normal message according to the radio standard. In other words, the signal level of the urgent message is less than the signal level of the normal message. With the term “radio channel”, that frequency band is meant in the manner known per se, in which messages are transmitted in the radio network. Thus, the normal message and the urgent message occupy the same radio channel or the same frequency band in the frequency spectrum. Thus, they form a superimposition signal or superposition signal.

The method provides for the respective receiving vehicle that a respective receiving circuit of the at least one receiving vehicle receives the superimposition signal, which contains the normal message and the urgent message, from the radio channel and reconstructs the normal message from the superimposition signal and models a signal portion of the normal message in the superimposition signal based on the reconstructed normal message and ascertains a residual signal, which describes a difference between the superimposition signal and the modeled signal portion, based on the superimposition signal and the modeled signal portion of the normal message, and reconstructs the urgent message based on the residual signal. Thus, the superimposition signal represents that signal, which is received from the radio channel, thus from the environment, by the receiving circuit via the antenna. Since the urgent message has been emitted with a lower transmission level, the normal message represents the strongest signal or the dominant signal, and the receiving circuit can reconstruct the normal message in a manner known per se, for example based on a correlation reception and/or a decoding. The normal message has that transmission level, as it is provided for a free radio channel according to the radio standard of the radio network. If the normal message is then present separated, thus, an artificial transmitting signal can be generated from it as it would result if the normal message should be again emitted. The difference between the received superimposition signal and this modeled signal portion, which the normal message has to have in the superimposition signal, results in a residual signal, which has to compose from the signal of the urgent message and a channel noise. Since the dominating signal of the normal message is now removed or at least reduced in the residual signal, the urgent message can also be reconstructed with the method for the signal reception known per se, thus for example correlation reception and/or decoding. With reconstructing, it is meant that one extracts or detects the digital data of the respective message (normal message and urgent message) from a signal course. The superimposition signal can be buffered for ascertaining the residual signal until the modeled signal portion is formed. The superimposition signal can be a receiving signal in the frequency band of the radio channel or an intermediate frequency or a baseband.

The advantage arises by the present disclosure that a time delay does not arise even with an occupied radio channel if the urgent message is to be emitted. It does not have to be waited until the radio channel is again free.

In the present disclosure, for adjusting the transmission level, a modem of the transmitting circuit is controlled. Additionally or alternatively, an antenna compensation circuit is switched off. In order to specifically adjust a transmission level for the urgent message, thus, a modem of the transmitting circuit can be controlled. Additionally or alternatively thereto, an antenna compensation circuit, which adapts a transmission level for normal messages in automated manner, can be switched off with particularly low technical effort in emitting the urgent message. Hereby, the said hop or the said reduction of the transmission level by 6 decibels to 10 decibels results.

The present disclosure also includes embodiments, by which additional advantages arise.

In an embodiment, a transmitting signal of the subscriber, which has emitted the normal message, is reproduced for the said modeling of the signal portion of the normal message from message data of the reconstructed normal message in the respective receiving vehicle, and the reproduced transmitting signal is adapted to a reception level, which the received superimposition signal has at the receiving circuit, to ascertain the signal portion. In other words, an artificial transmitting signal is generated from the message data of the reconstructed normal message, thus, the receiving process is inverted or passed rearwards to obtain a temporal signal course of the transmitting signal and/or the spectrogram thereof. Additionally, it is taken into account that each receiving vehicle observes a different reception level of the normal message since the distance of the respective receiving vehicle from the subscriber, which has emitted the normal message, is different, whereby an attenuation of the transmitting signal of the subscriber differs. Therefore, the reception level of the superimposition signal is used to scale the reproduced transmitting signal or to attenuate it such that the amplitude thereof satisfies a coincidence criterion with the amplitude of the superimposition signal. The coincidence criterion can for example specify that the maxima of the superimposition signal have to coincide with the maxima of the reproduced transmitting signal and/or an envelope of the superimposition signal and an envelope of the reproduced transmitting signal are adapted with respect to the amplitude. A temporal synchronization can for example be provided by means of a correlation to first temporally synchronize the reproduced transmitting signal with the superimposition signal.

In an embodiment, the normal message is transmitted in a preset time slot of a synchronous data transfer in the radio network. The transmitting circuit of the transmitting vehicle then emits its urgent message with a predetermined time offset with respect to a start point of time of the time slot and, for checking to the effect if the urgent message is contained in the superimposition signal, the receiving circuit examines such a signal section in the superimposition signal, which corresponds to the start point of time of the time slot plus the provided time offset, for the presence of a predetermined header (header data) of a possible urgent message. Preferably, the time offset is zero in order not to lose time. Thus, it will be assumed that a synchronous data transfer is effected in time slots. The transmitting circuit transmits the urgent message in the time slot, in which the normal message is also transferred. In particular, the said time offset can be zero such that the transmitting circuit also transmits its urgent message at the same point of time as also the other subscriber emits its normal message. Thus, the urgent message is also completely in the time slot. In that it is known in the receiving circuit, with which time offset the transmitting circuit inserts the urgent message into the time slot, thus for example immediately from the beginning of the time slot (time offset is 0), it can be specifically examined by detecting the header (for example by means of correlation) if a possible urgent message is contained in a time slot anyway. Herein, the header of the urgent message can be known in the receiving circuit, for example be recorded in a storage and/or in a correlation circuit. The urgent message is preferably a message, the content of which is already known in the receiving circuit (so-called well known message). Thus, it is not the content of the urgent message itself, which transfers the information, but the fact that the urgent message has been emitted by a transmitting vehicle anyway, which can represent an information for the respective receiving vehicle. Instead of a synchronous data transfer, a packet-oriented data transfer can also be provided.

In an embodiment, multiple modulation coding schemes and/or a numerology concept are provided in the radio network for transmitting normal messages and the coding with the greatest redundancy and/or a rateless coding scheme is used therefrom for the urgent message (modulation coding scheme, NR numerology concept). Thus, the radio standard of the radio network can provide that a code rate or a portion of redundancy in a respective transmitting signal of a normal message can be adapted depending on a noise level in that the code rate is selected from multiple possible, preset code rates. They are so-called modulation coding schemes and/or numerology concepts. Therein, the coding with the lowest code rate or, the other way around, with the greatest redundancy is selected for the urgent message. Thus, it is ensured that the urgent message can be reliably reconstructed and/or recognized by the respective receiving circuit despite of the normal message with the greater signal transmission level or signal level.

In an embodiment, the transmission level of the urgent message is adjusted lower by a factor of 6 decibels to 10 decibels than the transmission level of the normal message. The said value interval for the transmission level of the urgent message has proven particularly reliable to allow the error-free reconstruction of a normal message (for which the urgent message represents additional noise) on the one hand as well as to allow a reliable reconstruction of the urgent message itself. Adjusting the transmission level can be adaptively effected depending on a noise level and/or reception level of the normal message adapted by the transmitting circuit.

In an embodiment, the transmitting vehicle and the at least one receiving vehicle operate the radio network as an ad-hoc network for a cooperative driving operation and the urgent message signals that the transmitting vehicle aborts the cooperative driving operation and/or leaves the ad-hoc network. The transfer of an urgent message is important in the described manner in particular in an ad-hoc network, via which motor vehicles perform a cooperative driving operation, thus e.g. a convoy drive. The urgent message can then be that message, by which the transmitting vehicle signals to each receiving vehicle that the transmitting vehicle aborts the cooperative driving operation and/or even leaves the ad-hoc network.

An aspect of the invention relates to a transmitting circuit for a motor vehicle, wherein the transmitting circuit comprises a control device, which is configured to emit a message identified as urgent into a radio channel of a radio network and herein to detect if the radio channel is occupied by a transfer of a normal message of another subscriber, and in this case to emit the message as an urgent message in the radio channel with a transmission level, which is less than it is provided according to a radio standard of the radio network for transmitting the normal message. Thus, those method steps can be performed by means of the transmitting circuit, which relate to the transmitting vehicle. The transmitting circuit can also be developed in the described manner in that additional features, as they have already been described in context of the implementations of the method according to the aspect, are also implemented in the transmitting circuit.

An aspect of the invention relates to a receiving circuit for a motor vehicle, wherein the receiving circuit is configured to receive a superimposition signal, which contains a normal message and an urgent message, from a radio channel of a radio network and to reconstruct the normal message from the superimposition signal and to model a signal portion of the normal message in the superimposition signal based on the reconstructed normal message, and to ascertain a residual signal, which describes a difference between the superimposition signal and the modeled signal portion, based on the superimposition signal and the modeled signal portion of the normal message, and to reconstruct the urgent message based on the residual signal. Thus, the receiving circuit can perform those method steps of an embodiment of the method according to the aspect, which are intended for the respective receiving vehicle.

Herein, the transmitting circuit and/or the receiving circuit can each comprise a control circuit to execute and/or initiate or control the described method steps. The control circuit can comprise a data processing device or a processor device, which is configured to perform an embodiment of the method according to the present disclosure. Hereto, the processor device can comprise at least one microprocessor and/or at least one microcontroller and/or at least one FPGA (Field Programmable Gate Array) and/or at least one DSP (Digital Signal Processor). Furthermore, the processor device can comprise program code, which is configured to perform the embodiment of the method according to the present disclosure upon execution by the processor device. The program code can be stored in a data storage of the processor device.

An aspect of the invention relates to a motor vehicle with an embodiment of the transmitting circuit according to the present disclosure and/or with an embodiment of the receiving circuit according to the present disclosure. The motor vehicle according to the present disclosure is preferably configured as a car, in particular as a passenger car or truck, or as a passenger bus or motorcycle. Thus, the motor vehicle according to the present disclosure can be operated as a transmitting vehicle and/or (in a different driving situation) as a receiving vehicle for a cooperative driving operation.

The present disclosure also includes the combinations of the features of the described embodiments. Thus, the present disclosure also includes realizations, which each comprise a combination of the features of multiple of the described embodiments, if the embodiments have not been described as mutually exclusive.

The embodiments explained in the following are preferred embodiments of the present disclosure. In the embodiments, the described components of the embodiments each represent individual features of the present disclosure to be considered independently of each other, which also each develop the present disclosure independently of each other. Therefore, the disclosure is to include also combinations of the features of the embodiments different from the illustrated ones. Furthermore, the described embodiments can also be supplemented by further ones of the already described features of the present disclosure.

In the figures, identical reference characters each denote functionally identical elements.

FIG. 1 illustrates motor vehicles 10, which can drive on a road 11. An exemplary situation is illustrated, in which the motor vehicles 10 have first waited at a traffic light 12 and the traffic light 12 has turned green by a phase change 13 such that the motor vehicles 10 are allowed to move off. In the motor vehicles 10, a driver assistance function 14 can be provided, which can be configured as an autonomous driving function or as a driver assisting function, for example ACC (Automatic Cruise Control). By means of the driver assistance function 14, the motor vehicles 10 can for example drive as a convoy 15 in coordinated manner or generally execute a coordinated driving operation 16 by means of the driver assistance function 14. An example for another coordinated driving operation 16 is possible at a cross-roads, where motor vehicles 10 give the right of way in automated manner. In the coordinated driving operation 16 of the convoy 15, it can for example be provided to cause the motor vehicles 10 to commonly start or accelerate after the phase change 13 such that they are put into motion as a queue or convoy.

For the coordinated driving operation 16, the motor vehicles 10 can be coupled to or coordinated with each other via a radio network 17 to coordinate driving maneuvers. For example, an acceleration value for starting can be agreed between the motor vehicles 10. Hereto, each motor vehicle 10 can comprise a communication circuit 18, which can operate the radio network 17 for example based on WIFI or mobile radio. In particular, the radio channel 27 can be based on the V2X communication standard. The radio network 17 can for example be an ad-hoc network, to which motor vehicles 10 can subscribe, which are in a common transmitting range, thus can reach each other directly via radio links (without intervention of a mobile radio network or another stationary network). The respective communication circuit 18 can be coupled to the driver assistance function 14 via a control circuit 19, which can be configured as a transmitting circuit 20 for emitting messages 21 and/or as a receiving circuit 22 for receiving messages 21.

The coordinated driving operation 16 presumes that each of the motor vehicles 10, which subscribes to it, actually knows the respectively agreed driving maneuver and can execute it. In FIG. 1, an exemplary situation is illustrated, in which an unforeseen traffic obstruction 24 renders the execution of a coordinated driving maneuver impossible for one of the motor vehicles 10 (here denoted as motor vehicle 23). As the traffic obstruction 24, a pedestrian or cyclist can for example have gotten into the driveway of the motor vehicle 23. In order that the remaining motor vehicles 10 can consider that despite of the agreed driving maneuver, the motor vehicle 23 will not execute this driving maneuver and/or will not execute further coordinated driving maneuvers, the motor vehicle 23 has to inform the remaining motor vehicles 10 by means of an urgent message 25 that it aborts the coordinated driving operation 16, thus does no longer belong to the convoy 15 or is no longer coordinated with it.

Hereto, a radio channel 27 of the radio network 17 can be used. A radio channel 27 can be a frequency range. Over the time t, the urgent message can be emitted into the radio channel 27. In FIG. 1, it is exemplarily shown, how the radio channel 27 arises over the time t and the frequency f. The emission of messages 21 into the radio channel 27 can be provided or preset in time slots 28 for the radio network 17, which can arise by the used radio standard.

FIG. 1 shows, how the situation can arise that at the point of time or the period of time, at which the motor vehicle 23 as the transmitting vehicle 29 has to emit the urgent message 25 in the radio network 17, another motor vehicle as a further subscriber 30 of the radio network 17 already emits a normal message 31. With normal message, it is meant that the subscriber 30 is allowed to claim the radio channel 27 for itself, as it has resulted according to the protocol or radio standard of the radio network 17. Thus, the radio channel 27 is occupied by the normal message 31 when the transmitting vehicle 29 has to emit its urgent message 25 to the remaining motor vehicles. Here, the remaining motor vehicles 10 are referred to as receiving vehicles 33 for distinguishing. Herein, it can be allowed in the motor vehicles 10 by the configuration of the control circuit 19 that the urgent message 25 can still be emitted without delay, that is without waiting until the normal message 31 does no longer occupy the radio channel 27.

FIG. 1 illustrates, how a superposition of the normal message 32 and the urgent message 25 arises over the time t in the relevant time slot 28 in that the transmitting vehicle 29 superposes or superimposes the urgent message 25 on the normal message 32 with its transmitting circuit 20 in that it is simultaneously transmitted. For example, the entire time slot 28 can be provided both for the normal message 32 and the urgent message 25 accurate in time slot. The two messages (normal message 31 and urgent message 25) can also at least partially overlap in the frequency range.

Figure 2:
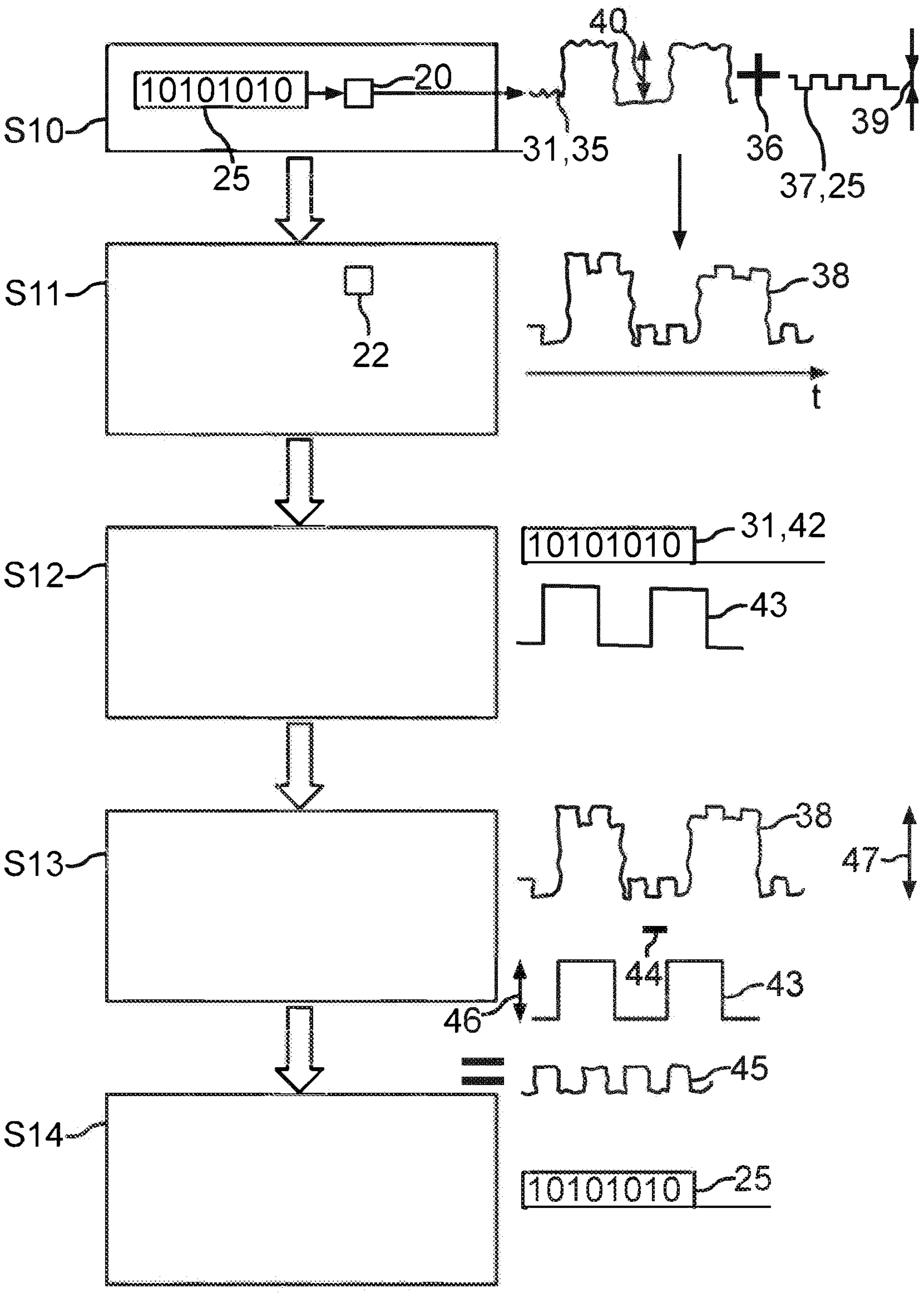
FIG. 2 illustrates a flowchart of the method, in accordance with one embodiment.

FIG. 2 illustrates, how the urgent message 25 can still be received by a receiving circuit 22 in each of the receiving vehicles 33. In a step S10, the transmitting circuit 20 can receive the urgent message 25. Here, the urgent message 25 is exemplarily illustrated by message data in the form of an image sequence. Although the normal message 31 is contained in the radio channel 27 as a transmitting signal 35 of a subscriber 30, the transmitting signal 37 of the urgent message 25 can also be emitted by superimposing 36 or superposing. Hereby, a superimposition signal 38 (superposition signal) arises. Herein, a transmission level 39 of the transmitting signal 37 of the urgent message 25 is selected lower than a transmission level 40 as it is actually provided for the transmitting circuit 20 for emitting a normal message.

In a step S1, the superimposition signal 38 can be received by a respective receiving circuit 22 of a receiving vehicle 33. It is a mixture or superimposition of the transmitting signal 35 of the normal message, the transmitting signal 37 of the urgent message 25 and a channel noise or noise signal.

However, since the transmitting signal 35 of the normal message 31 is dominant, it can be decoded by the receiving circuit 22 in a step S12, wherein the urgent message 25, that is the transmitting signal 37 thereof, is considered as noise. Thus, the normal message 31 can be reconstructed such that a reconstructed normal message 42 results. The reconstructed normal message 42, that is the data thereof, can be used to generate an artificial or reproduced transmitting signal 43. Hereto, the conversion of the data of the normal message 31 to an analog radio signal can be reproduced, wherefor a digital model can be used, which for example reproduces the conversion procedures in a transmitting circuit 20. Thus, a signal course and/or a signal spectrum of the normal message 31 is present as a reproduced transmitting signal 43. In a step S13, the reproduced transmitting signal 43 can for example be removed or subtracted by means of a subtraction 44 from the received superimposition signal 38. Thus, a difference between the (ideal) reproduced transmitting signal 43 and the superimposition signal 38 results. This difference represents a residual signal 45, which still contains the noise and the transmitting signal 43 of the urgent message 25. Herein, a level 46 of the reproduced transmitting signal 43 can also be adapted to a reception level 47 of the superimposition signal 38.

Based on the residual signal 45, the urgent message 25, that is the data thereof, can be decoded in a further decoding in a step S14.

Thus, both the normal message 41 and the urgent message 25 are then present in the receiving circuit 22.

Based on the urgent message, the driver assistance function 14 of the receiving vehicle 33 can then be configured or adapted to the effect that it is taken into account that the transmitting vehicle 29 does no longer subscribe to the coordinated driving operation 16. For example, a safety distance to the transmitting vehicle 29 can be preset and/or it can be taken into account that the transmitting vehicle 29 is to be considered as a non-cooperative traffic participant for example in a trajectory planning.

Thus, the idea is in emitting the urgent message 25 synchronously with the normal message of another subscriber occupying the radio channel. The emission of the urgent message is effected with lower power than provided according to the radio standard and additionally with the maximally available redundancy. In order to adjust the lower power, a modem of the transmitting circuit can for example be controlled, and/or a vehicle antenna compensator can be switched off. Here, a reduction of 6 decibels to 10 decibels in relation to a regular message according to the V2X communication standard is preferably effected. The lowest modulation coding scheme MCS can be used to obtain robustness or redundancy. Here, the specification MCS is to be understood for the mobile radio standard LTE, however, other MSC configurations can also be provided. In case of NR-V2X, the most robust numerology concept can be used. If possible, it can also be provided to apply a rateless coding scheme on a higher communication layer, for example the application layer or the network layer, for multiple transmissions in the same occupied radio channel.

This results in a superposition or a superimposition signal of the used normal message and the simultaneously transmitted urgent message for the receiving vehicles in the radio network. With the urgent message, thus, it can be signaled simultaneously with the normal message that a phase transition (leaving the coordinated driving operation) is performed in the transmitting vehicle 29. The respective receiving circuit of a receiving vehicle can perform the superimposition signal by hierarchically decoding or iteratively decoding with feedback (in the form of the reproduced transmitting signal) according to the described steps S11 to S14. This corresponds to a decoding according to the type of decision feedback decoding. Hereby, it can be recognized if an urgent message is also in a time slot 28 in addition to a normal message.

Preferably, such a short message (amount of data) is used as the urgent message that a temporal duration for transmitting the urgent message together with the corresponds to or is shorter than the period of time of the time slot in redundancy bits. With a regular message or normal message according to the V2X standard, such as for example a BSM (basic safety message), an amount of data of 120 bytes is possible such that a much shorter message, for example less than 40 bytes, can be transmitted together with the corresponding redundancy in a time slot 28 as an urgent message. If synchronous data transfer is provided, a time offset between normal message and urgent message can be selected according to a specification, which can be known both in the transmitting vehicle 29 and in each receiving vehicle 33 such that a header of the urgent message can be specifically searched or detected in the residual signal 45. If such a header is not detected at the preset location in the time slot, in particular at the beginning thereof, thus, it can be assumed that an urgent message is not contained in the time slot.

V2X communication does not use a central planning unit, but the subscribers have to find out if the radio channel is free or occupied. C-V2X and 5G NR-V2X use a semi-persistent planning, in which the apparatus monitors the channel by measurements. Before transfer of a message 21, it is known in the transmitting circuit if the channel will be occupied or free.

If an urgent message 25 has to be transmitted, thus, the vehicle will most likely be in the following situation: It has to inform other vehicles about its transition from a cooperative driving operation to an individual maneuver or the V2X radio channel is occupied since an unexpected situation has occurred and many vehicles try to communicate. Therefore, it is required to leave a message for all of the vehicles in the environment despite of the occupied radio channel.

Overall, the examples show, how a phase transition can be provided in complex V2X communication procedures.

The invention claimed is:

1. A method comprising:

emitting, by a transmitting circuit of a vehicle, a transmitted urgent message in a radio channel with a transmission level that is less than a transmission level of a normal message, wherein the transmission level of the transmitted urgent message is adjusted by controlling a modem of the transmitting circuit and/or by switching off an antenna compensation circuit, and wherein the normal message is emitted in the radio channel by a subscriber of a radio network that is different from the vehicle;

receiving, from the radio channel, by a respective receiving circuit of the vehicle, a superimposition signal that includes the normal message and a received urgent message;

reconstructing the normal message from the superimposition signal;

modeling a signal portion of the normal message in the superimposition signal based on the reconstructed normal message and a transmitting signal of the subscriber;

ascertaining a residual signal based on the superimposition signal and the modeled signal portion of the normal message, wherein the residual signal describes a difference between the superimposition signal and the modeled signal portion, wherein an envelope of the transmitting signal and an envelope of the superimposition signal are adapted based on an amplitude such that a maximum amplitude of the transmitting signal coincides with a maximum amplitude of the superimposition signal, and wherein the transmitting signal is temporarily synchronized with the superimposition signal; and reconstructing the received urgent message based on the residual signal.

2. The method of claim 1, further comprising:

reproducing the transmitting signal of the subscriber for modeling the signal portion from message data of the reconstructed normal message; and adapting the reproduced transmitting signal to a reception level of the superimposition signal at the receiving circuit to ascertain the signal portion.

3. The method of claim 1, wherein the normal message is transmitted in a preset time slot of a synchronous data transfer in the radio network, the method further comprising:

transmitting, by the transmitting circuit, the transmitted urgent message with a predetermined time offset with respect to a start point of time of the preset time slot; and determining, by the receiving circuit, if the received urgent message is included in the superposition signal by examining a signal section in the superposition signal for a presence of a predetermined header of a possible urgent message, wherein the signal section corresponds to the start point of time of the preset time slot plus the predetermined time offset.

4. The method of claim 1, wherein the normal message is transmitted using multiple modulation coding schemes or a numerology concept, and wherein transmitting the transmitted urgent message uses coding with a greatest redundancy scheme or a rateless coding scheme.

5. The method of claim 1, wherein the transmission level of the transmitted urgent message is adjusted lower than the transmission level of the normal message by a factor of 6 decibels to 10 decibels.

6. The method of claim 1, wherein the vehicle operates the radio network as an ad-hoc network for a cooperative driving operation, and wherein the transmitted urgent message indicates that the vehicle terminates the cooperative driving operation or leaves the ad-hoc network.

7. The method of claim 1, wherein the transmission level of the transmitted urgent message is adjusted by switching off the antenna compensation circuit.

8. A motor vehicle comprising:

a transmitting circuit, wherein the transmitting circuit comprises a control device that is configured to:

detect whether a radio channel of a radio network is occupied by a transfer of a normal message of a subscriber of a radio network that is different from the motor vehicle;

when the normal message of the subscriber is detected as occupying the radio channel, emit an urgent message in the radio channel with a transmission level that is less than a transmission level of the normal message; and adjust the transmission level of the urgent message by controlling a modem of the transmitting circuit, and/or by switching off an antenna compensation circuit, wherein the normal message is emitted in the radio channel by the subscriber;

a receiving circuit, wherein the receiving circuit comprises the control device that is configured to:

receive a superimposition signal that includes another normal message and another urgent message from the radio channel;

reconstruct the other normal message from the superimposition signal;

model a signal portion of the other normal message in the superimposition signal based on the reconstructed other normal message and a transmitting signal of the subscriber;

ascertain a residual signal based on the superimposition signal and the modeled signal portion of the other normal message, wherein the residual signal describes a difference between the superimposition signal and the modeled signal portion, wherein an envelope of the transmitting signal and an envelope of the superimposition signal are adapted based on an amplitude such that a maximum amplitude of the transmitting signal coincides with a maximum amplitude of the superimposition signal, and wherein the transmitting signal is temporarily synchronized with the superimposition signal; and reconstruct the other urgent message based on the residual signal.

9. The motor vehicle of claim 8, wherein the control device is further configured to adjust the transmission level of the urgent message by switching off the antenna compensation circuit.

* * * * *